United States Patent
Chehovits et al.

(10) Patent No.: US 6,362,257 B1
(45) Date of Patent: Mar. 26, 2002

(54) PAVEMENT PATCH MATERIAL

(75) Inventors: James G. Chehovits, Mesa; Robert Lowell Parkison, Gilbert, both of AZ (US)

(73) Assignee: Crafco, Incorporated, Chandler, AZ (US)

( * ) Notice: Subject to any disclaimer, the term of this patent is extended or adjusted under 35 U.S.C. 154(b) by 0 days.

(21) Appl. No.: 09/384,119

(22) Filed: Aug. 27, 1999

(51) Int. Cl.[7] .............................................. C08L 95/00
(52) U.S. Cl. ............................. 524/59; 524/62; 524/67; 106/217.8; 106/276; 106/400; 106/502
(58) Field of Search ........................... 524/59, 62, 67, 524/68, 71; 104/684, 123.12, 157.71, 169.49, 217.8, 217.9, 273.1, 275, 276, 285, 400, 416, 476, 502, 320

(56) References Cited

U.S. PATENT DOCUMENTS

| | | | |
|---|---|---|---|
| 3,336,252 A | 8/1967 | Raichle et al. | 260/28.5 |
| 3,639,322 A | 2/1972 | Bathgate et al. | 260/28.5 |
| 3,679,626 A | 7/1972 | Tanekusa et al. | 260/41 |
| 3,849,355 A | 11/1974 | Yamaguchi et al. | 260/28.5 |
| 3,896,069 A | 7/1975 | Kosaka et al. | 260/28.5 |
| 4,021,393 A | 5/1977 | McDonald | 260/28.5 |
| 4,027,059 A | 5/1977 | Koons | 428/36 |
| 4,058,641 A | 11/1977 | Hnojewyj | 427/137 |
| 4,235,640 A | 11/1980 | Cox et al. | 106/308 |
| 4,240,946 A | 12/1980 | Hemersam | 260/28.5 |
| 4,250,067 A * | 2/1981 | Bresson | 206/28.5 |
| 4,299,761 A * | 11/1981 | Emmons et al. | 260/42.53 |
| 4,301,050 A * | 11/1981 | Masuda et al. | 260/28 |
| 4,328,147 A * | 5/1982 | Chang et al. | 524/59 |
| 4,382,989 A * | 5/1983 | Chang et al. | 428/280 |
| 4,400,413 A * | 8/1983 | Emmons et al. | 427/136 |
| 4,403,067 A * | 9/1983 | Uffner | 525/54.5 |
| 4,479,827 A * | 10/1984 | Ward | 106/281 R |
| 4,485,145 A * | 11/1984 | Harrington et al. | 428/378 |
| 4,569,968 A * | 2/1986 | Uffner et al. | 525/54.5 |
| 4,613,632 A * | 9/1986 | Aliani et al. | 523/172 |
| 4,744,693 A | 5/1988 | Smith | 404/77 |
| 4,745,155 A | 5/1988 | Grossi | 525/54.5 |
| 4,755,545 A | 7/1988 | Lalwani | 524/64 |
| 4,793,729 A | 12/1988 | Bosich | 404/72 |
| 4,833,184 A | 5/1989 | Higgins | 524/60 |
| 4,868,233 A | 9/1989 | Moran | 524/71 |
| 4,873,275 A | 10/1989 | Moran et al. | 524/64 |
| 4,889,880 A | 12/1989 | Miller | 524/71 |
| 5,026,609 A | 6/1991 | Jacob et al. | 428/489 |
| 5,047,457 A | 9/1991 | Higgins | 524/60 |
| 5,118,733 A | 6/1992 | Gelles et al. | 524/68 |
| 5,120,154 A | 6/1992 | Lasch et al. | 404/14 |
| 5,180,428 A | 1/1993 | Koleas | 106/277 |
| 5,219,901 A | 6/1993 | Burke et al. | 523/205 |
| 5,223,031 A * | 6/1993 | Sugie et al. | 106/277 |
| 5,244,304 A | 9/1993 | Weill et al. | 404/67 |
| 5,290,833 A | 3/1994 | Schmanski | 524/71 |
| 5,336,705 A | 8/1994 | Gorbaty et al. | 524/68 |
| 5,342,866 A | 8/1994 | Trumbore et al. | 524/68 |
| 5,393,811 A | 2/1995 | Moran et al. | 524/71 |
| 5,399,598 A | 3/1995 | Peters | 524/68 |
| 5,403,117 A | 4/1995 | Okuyama et al. | 404/34 |
| 5,436,285 A | 7/1995 | Causyn et al. | 524/68 |
| H1484 H * | 9/1995 | Collins | 524/59 |
| 5,556,225 A | 9/1996 | Marino | 404/77 |
| 5,637,141 A | 6/1997 | Puzic et al. | 106/274 |
| 5,702,199 A | 12/1997 | Fishback et al. | 404/17 |
| 5,703,148 A | 12/1997 | Jolivet et al. | 524/62 |
| 5,719,215 A * | 2/1998 | Liang et al. | 524/62 |
| 5,725,652 A * | 3/1998 | Schulman | 106/677 |
| 5,744,524 A | 4/1998 | Manandhar et al. | 524/70 |
| 5,749,674 A | 5/1998 | Wilson, Sr. | 404/75 |
| 5,773,496 A | 6/1998 | Grubba | 524/68 |
| 5,888,279 A * | 3/1999 | Salmonsen et al. | 106/2 |
| 5,902,852 A * | 5/1999 | Schulz et al. | 524/821 |
| 6,074,469 A * | 6/2000 | Collins et al. | 106/273.1 |

OTHER PUBLICATIONS

Kandahl, Prithvi S. and Dale B. Mellott, "Pennsylvania's Experience with the Design, Construction and Performance of Gussasphalt," date unknown.

Road Techs "Innovators in Road Technology," Product Specifications for Roadpatch™, Roadlfex™, and Hotcrete, Jul. 1996.

The Ultimate Pavement Repair System, Crafco, Inc.

Asphalt Pavement Repair Manuals of Practice, Strategic Highway Research Program, SHRP–H–348, pp. 1–73.

Block Copolymer Modification of Asphalt Intended for Surface Dressing Applications, J.H.Collins & W.J. Mikols, pp. 1–17.

Innovative Materials Development and Testing, vol. 2: Pothole Repair, T. Wilson, A. Romine, ERES Consultants, Inc., Strategic Highway Research Program, SHRP–H–353, pp. 1–2223.

(List continued on next page.)

Primary Examiner—Edward J. Cain
Assistant Examiner—Katarzyna I Wyrozebski-Lee
(74) Attorney, Agent, or Firm—Nilles & Nilles, S.C.

(57) ABSTRACT

The pavement patch composition of the present invention comprises a lightweight aggregate and highly modified polymer asphalt binder. The composition is formed by heating the binder to a flowable state, mixing the flowable binder with a lightweight aggregate, and then allowing it to cool into a solid form. The pavement patch composition is used to repair voids in pavement, such as pot holes, cracks and depressions. It is applied by heating solid pavement patch composition to a flowable state and applying it to the void, or on a surface in need of repair, and then allowed to cool. The resulting patch is self-adhering, strong and flexible. The formulation of the pavement patch composition may be adjusted for specific use in a cold climate, a moderate climate, a warmer climate, or for use in various traffic applications.

44 Claims, 3 Drawing Sheets

OTHER PUBLICATIONS

Evaluation of Experimental Cold–Stockpiled Patching Materials for Repairs in Cold and Wet Weather, Highway Maintenance Operations and Research 1990, Transportation Research Record No. 1268, H. R. Thomas and D. Anderson, pp. 52–58.

Evaluation of Cold Mixes for Winter Pothole Repair, B. Prowell & A. Franklin, Transportation Research Record 1529, pp. 76–85.

Crack Sealing Cost Effective Technique for Use in Pavement Management, Crafco, Inc., pp. 1–5.

Expanded Shale, Clay & Slate, A World of Applications . . . Worldwide, ESCSI, Pub. 7600, 1995.

Save Lives! Increase the Skid Resistance of Your Roads, ESCSI Information Sheet #548.1, 1993.

The Road to Success is Paved with Lightweight Aggregate, ESCSI.

ESCSI, Lightweight Aggregate–The Proven Solution to a Safe and Economical Road Surface, Info. Sheet #565.1.

Innovative Materials and Equipment for Pavement Surface Repairs, SHRP–M/UFR–91–504, pp. 1–136, Feb. 1991.

Pothole Primer: A Public Administrator's Guide to Understanding and Managing the Pothole Problem, U.S. Army Corps of Engineers, Special Rpt. 81–21, pp. 1–28, Sep. 1981.

Long Term Monitoring of Pavement Maintenance Materials Test Sites, FHWA–RD–98–073, Jun. 1998.

Asphalt In Pavement Maintenance—Chapter II, The Asphalt Institute, MS–16, Mar. 1983.

Improved Performance of Paving Asphalts by Polymer Modification, J. Collins, M. Bouldin, R. Gelles & A. Berker, AAPT–1991, pp. 43–79.

Modified Asphalt Pavement Materials The European Experience, Terrel, Walter, AAPT–1986.

Pennsylvania's Experience with Design, Construction and Performance of Gussasphalt, Kandahl and Mellott, AAPT–1997.

* cited by examiner

PAVEMENT PATCH MATERIAL

FIELD OF THE INVENTION

The invention relates to compositions for use in patching and filling voids in pavement or concrete and to methods of making and applying the compositions.

BACKGROUND OF THE INVENTION

Typical compositions which are used to patch and fill voids such as cracks, depressions, potholes, deteriorated joints, and other defects in pavements are composed of an asphaltic binder or adhesive, and a mineral aggregate.

Mineral aggregate is generally defined as various sources of rock, gravel, sand, crushed stone, or cinders that are used in asphalt or concrete compositions to provide the bulk of the composition and to support the loads imposed by traffic. The specific gravity of typical aggregate ranges from approximately 2.5 to 2.8.

The binders used in typical patching mixes are various types of asphalt products. For hot mix patching mixes, asphalt cement is used. For cold applied patching mixes, either emulsified (water based) or cutback (solvent cut) asphalt is used. The function of the binder is to hold the aggregate fraction together to provide a durable product with load carrying capabilities. The specific gravity of typical asphalt binders is approximately 0.99 to 1.04.

Asphalt binders change in stiffness or consistency with variations in temperature. At low temperatures, (typically below 32° Fahrenheit (F.)), asphalt binders are stiff and brittle. At high temperatures, (above 100° to 150° F.) asphalt binders are fluids. The changes in stiffness of asphalt binders are gradual softening with temperature increases, and gradual stiffening with temperature decreases. Typical asphalt binders, when tested for softening point in accordance with ASTM D36, "Test Method for Softening Point of Bitumen (Ring and Ball Apparatus)" have values ranging from approximately 100° F. for very soft materials to approximately 130° F. for very stiff materials. The softening point temperature for asphalt binders indicates the approximate temperature at which it reaches a flowable thick liquid consistency.

Soft asphalts become brittle at lower temperatures then stiffer asphalts.

In patching mixtures, typical proportions of asphaltic binder and aggregate are approximately 5 to 10 percent binder by total weight of the mixture, and 90 to 95 percent aggregate fraction. Due to the differences in specific gravity of the asphalt binder and aggregate, the proportions by volume are different from those indicated by weight. By volume, the proportion of binder typically is 12 to 23 percent and the proportion of aggregate typically is 77 to 88 percent. The specific gravity of typical patching mixes is approximately 2.2 to 2.4, which means the mix typically weighs between approximately 18 and 20 pounds per gallon.

For a typical semi-truck and trailer, maximum shipping loads are limited to approximately 45,000 pounds per truckload. Typical truckloads can generally carry volumes of 4000 to 6000 gallons of lower density materials. However, for typical patching mixtures, this equates to a volume of approximately 2250 to 2500 gallons of mixture that the truck can hold before the 45,000 pound weight limit is reached. This volume range is lower than the truck's capacity, which means that part of it is empty when hauling typical patching mixtures. Because part of the truck is empty, shipping typical patching mixtures can be costly.

In general, the amount of asphalt binder in the mixture or blend is governed by providing sufficient binder volume for mixture integrity and durability. Too much binder, however, will result in mixture instability during hot weather when the asphalt softens.

Increased amounts of asphalt binder are desirable because it provides increased levels of durability and flexibility to the mixture. However, the maximum amount that can be used usually is limited by the need for adequate high temperature stability.

With amounts of asphalt binder typically used in patching mixtures, there generally is insufficient binder present for the mixture to establish good adhesion to the pavement. Thus, adhesion is generally enhanced by first applying a priming or tacking coat of an asphalt material to the pavement surface.

Typical asphalt and aggregate patching mixtures must be compacted to orient the aggregate particles and increase the density of the patch to provide a stable mixture that resists deformation from applied loads. Compaction is usually accomplished using motorized rollers or tampers designed for that purpose. Typical patching mixtures are also proportioned to contain a certain amount of air voids within the mix after compaction. Typical void amounts range from approximately 5 to 15 percent by volume. The purpose of these voids is to provide additional volume within the mix so that when additional compaction due to traffic loads occurs, the asphalt binder can migrate into the voids. If the voids in a typical patching mix are too low, due to having an excess of asphalt or excessive fines in the aggregate, the material may experience bleeding due to migration of the asphalt binder and instability when subjected to traffic loads. The asphalt binder can tend to migrate under loading at warm summer temperatures due to its softness.

Pavement surface temperatures reached in the summer often reach 140° to 160° F. At these temperatures, typical asphalt binders can and will flow when subjected to traffic loading, and may bleed.

Small voids that are less than approximately 2 inches wide are typically filled with crack and joint sealers formed of materials such as asphalt binders, polymers and filler. Since the intended use of crack and joint sealers is only to bind and seal cracks and joints, they typically do not contain aggregate. This results in a composition that is too deformable for use in patching and filling intermediate or large voids in pavement, including concrete.

Larger sized pavement voids, greater then approximately 2 inches wide and over 2 inches deep, are typically filled with patching materials, and may require removal of old deteriorated pavement prior to being patched.

There are two known different types of patching mixtures that incorporate differing raw materials and blend compositions. The first is known as Güissasphalt. This material is used in Europe as a paving and patching material. Güissasphalt is a hot-mixed asphalt composition that uses a specialized aggregate gradation and asphalt cement. The aggregate and gradation uses a high amount of fines (typically approximately 20–25% material finer then a 200 mesh (0.074 mm) sieve), and an amount of asphalt cement binder to produce an essentially voidless mix. To aid in resisting bleeding at warm summer temperatures, relatively stiff asphalt is used. The amount of asphalt used is typically 8 to 11 percent by weight or 19 to 25 percent by volume. The stiff asphalt produces a mix that is not very flexible at low temperatures. The Frass Breaking Point (IP 80/53) for the asphalt binder used in Güissasphalt has been reported to be in the range of 16 to 28° F. For standard paving grade asphalts, which are typically more flexible at lower temperatures, results are approximately 0 to 15° F. It has also been reported that in order to prevent aggregate segregation, that constant agitation of the Güissasphalt mixture is required. Problems with aggregate segregation during application have been reported also, because it is sometimes difficult to achieve continuous agitation.

The second different type of patch material is produced by Viper.

The Viper composition contains approximately 25% binder by weight and approximately 75% standard weight aggregate with a specific gravity of about 2.7. The weight of the aggregate makes the Viper product very costly to ship. Additionally, because the aggregate is so heavy, trucks hauling Viper sometimes cannot be completely filled due to shipping weight restrictions. Moreover, because Viper uses standard weight aggregate, it must be agitated well when mixed or the aggregate will settle. If the aggregate settles, the applied Viper mixture can produce inconsistent results.

SUMMARY OF THE INVENTION

In view of the problems discussed above, it is an object of the present invention to provide an asphalt or pavement patching composition that is lightweight, self-adhesive, and flexible.

It is another object of the present invention to provide an asphalt or pavement patching composition that is easily applied to voids in need of repair.

It is another object of the present invention to provide an asphalt or pavement patching repair composition that may be applied without priming the surrounding asphalt or concrete.

It is a further object of the present invention to provide an aggregate containing asphalt or concrete repair composition that is lightweight.

It is an advantage that the pavement patching composition of the present invention is lightweight such that it maximizes the volume that can be shipped in a single truckload and reduces shipping costs.

It is another object of the present invention to utilize a binder made of an asphalt modified by the addition of at least one polymer to provide good flexibility, impact resistance, and adhesion.

It is another object of the present invention to utilize a binder that is highly modified by polymer.

In accordance with these objectives, the pavement patch composition of the present invention is an adjustable, hot-applied, self-adhesive, water-resistant composition for the maintenance and repair of voids in concrete or pavement. The pavement patch composition comprises a highly modified polymer asphalt binder and a lightweight aggregate. Variations in the formulation of the polymer asphalt binder allow the pavement patch composition to be specifically tailored for use in cold, moderate, or hot climates. In addition, the type and size of lightweight aggregate may be varied depending upon the desired use of the pavement patch composition. For example, finer aggregate is preferably used for patching small voids, but coarser and larger aggregate is preferred for use in larger voids.

It is an advantage of the pavement patch composition of the present invention in that it can be used to patch voids in asphalt pavement and concrete pavement.

It is another advantage of the pavement patch composition of the invention to provide a patch that includes an aggregate that is lightweight, makes up a significant volume of the patch, and which does not easily settle during application resulting in a patch that is more uniform and homogenous, has good wear resistance, and which possesses good impact toughness.

It is another advantage of the pavement patch composition of this invention that it is simple and economical to make and easy to use.

It is still another advantage of the pavement patch composition of this invention in that its constituents can be tailored for the climate of the region in which it is to be applied.

It is still another advantage of the pavement patch composition of this invention in that its constituents can be tailored for the particular vehicle traffic or loading conditions that will be encountered.

In one preferred embodiment, the pavement patch composition is formed by mixing lightweight aggregate with a hot, highly modified polymer asphalt binder. The hot mixture is then shaped into specifically measured portions and allowed to cool into a solid form. In use, the solid form is heated to a flowable state and applied to or poured into the voids in need of repair. The hot composition is then allowed to cool to form a flexible, weight bearing, water resistant, long lasting pavement patch.

The pavement patch composition is ideally used to repair mid-size voids including, but not limited to, cracks, depressions, raveled areas, and alligator cracks.

The pavement patch composition provides an alternative for repairing voids larger than cracks and joint gaps, which are typically filled with crack and joint sealant, and larger voids such as those repaired with pothole patch methods or by total replacement of the pavement section. The pavement patch composition comprises a lightweight aggregate and a highly modified polymer binder. Unlike conventional pavement patch compositions, the formulation of the asphalt binder of the present invention is variable for use in warm, moderate or cold climates. In its preferred embodiment, the asphalt binder comprises asphalt, polymer, and surfactant. In addition, the binder can contain processing oil. It can also contain other additives.

BRIEF DESCRIPTION OF THE DRAWINGS

At least one preferred exemplary embodiment of the invention is illustrated in the accompanying drawings in which like reference numerals represent like parts throughout and in which.

DETAILED DESCRIPTION OF THE PREFERRED EMBODIMENTS

Referring to FIGS. 1–5, the pavement patch composition 10 comprises a polymer-modified asphalt binder 12 and a lightweight aggregate 14 having a low density. The composition 10 is flowable when heated and is used for maintenance and repair of both asphalt and concrete pavement 16. The use of lightweight aggregate 14 in combination with a polymer-modified asphalt binder 12 produces a solid pavement patch 18 that is well bonded, load resistant, flexible, resilient, and long lasting. The preferred formulation and percentage of binder 12 used in the composition 10 can be varied depending on factors such as whether the composition 10 will be used in a cold climate, a moderate climate, or a warm climate. The preferred formulation and percentage can also be varied depending on the type of traffic application. In addition, the type and size of lightweight aggregate 14 used in the composition 10 can be varied depending upon the size of the void to be repaired and other factors.

In a preferred method of making the composition, the binder 12 is melted to a flowable state and combined with aggregate 14. The resultant composition 10 is cooled or allowed to cool until it solidifies. Preferably, the composition 10 is cooled to a solid state in a mold, or the like, that shapes it into individual measured forms 20 (FIG. 6), such as bricks or kegs, that are later reheated out in the field when the composition 10 is to be used.

In use, the solid pavement patch composition 10 is reheated until it reaches a flowable state. The flowable composition 10 is then poured into or otherwise applied to a void 22 in the pavement 16 and cooled or allowed to cool. The cooled composition 10 forms a patch 18 that is durable, resilient, long lasting, weather-resistant, impact-resistant, and which withstands loading.

The composition 10 of this invention is particularly well suited for filling mid-size pavement voids that include those that are larger than those typically filled with crack and joint sealants and associated methods, and those that are smaller than those typically filled using remove and replace methods or conventional pothole repair methods. It is preferably used to fill voids 16, including pavement cracks and joints, that are over approximately two inches (five cm) wide. The composition 10 is also well suited for filling small potholes that are at least two inches (five cm) in diameter or width, up to approximately four inches (ten cm) deep, and up to approximately twelve inches (thirty cm) in diameter or width, as well as pavement depressions that are at least two inches (five cm) in width, up to approximately two inches (five cm) deep, and up to approximately thirty-six inches (ninety-one cm) wide. The composition 10 can also be used for patching smaller voids.

The composition 10 can be used for other patching applications as well. For example, the composition 10 of this invention can be used to patch small, intermittent alligator cracked areas in pavement, level depressions in pavement cracks, level approaches to bridges, fill in low spots in pavement, repair road or highway shoulders, level utility cuts in pavement, and repair potholes. Other uses are also possible.

The pavement patch composition 10 comprises a lightweight aggregate 14 and a polymer-modified asphalt binder 12 that preferably is an asphalt binder highly modified by polymer. The composition 10 is formulated preferably for use in the repair of intermediate sized voids 22 that are larger than those typically repaired with crack or joint sealant, but smaller than those requiring complete removal and replacement of whole pavement sections.

The lightweight aggregate 14 used in the composition 10 of this invention is lightweight in that it has a specific gravity of no greater than 2.2. In one preferred embodiment, the lightweight aggregate 14 comprises an expanded aggregate. In another preferred embodiment, the lightweight aggregate 14 comprises sand that preferably is lightweight sand. In a still further preferred embodiment, the aggregate 14 comprises a mixture of expanded aggregate and sand.

Preferably, the lightweight aggregate 14 used in the composition 10 has a specific gravity between 1.1 and 1.8 and preferably no lower than 0.9. In one preferred embodiment, the lightweight aggregate has a specific gravity that is no greater than 1.4 and which preferably is no greater than about 1.35. Where an expanded aggregate is used, the expanded aggregate preferably has a specific gravity of between 1.1 and 1.5. Where sand is used, the sand preferably comprises a lightweight sand that has a specific gravity of between 1.2 and 1.8. If desired, the aggregate 14 can include some standard weight aggregate or sand.

Lightweight aggregates, such as expanded clay and expanded shale, are preferred because of their low specific gravity, which makes a lightweight final product. As a result, when the lightweight aggregate 14 is mixed with the binder 12 in making the pavement patch composition 10, the lightweight aggregate does not rapidly settle when the binder is in a molten state and therefore can be mixed easily and applied uniformly.

One known way of making expanded clay or expanded shale is to heat clay or shale aggregate in a kiln at a high temperature, typically about 2000° F., until it expands. When it expands, its weight per unit volume is reduced thereby reducing its specific gravity. Lightweight sand preferably is comprised of crushed expanded aggregate.

A preferred lightweight aggregate is a lightweight coarse aggregate (expanded aggregate) that has a sieve gradation where 100 weight percent passes a ⅜ inch sieve, 43 to 59 weight percent passes a ¼ inch Sieve, and 0 to 5 weight percent passes a No. 16 Sieve. This preferred lightweight coarse aggregate also has a dry loose weight of between thirty-nine and forty-five pounds (forty-two pounds average) per cubic foot, and a specific gravity of between 1.16 and 1.33 (1.25 average). If desired, aggregate having other gradation or gradation ranges can be used.

A preferred lightweight sand, which can be used alone as a lightweight aggregate or in combination with another lightweight aggregate, has a gradation of 100 weight percent passing a No. 4 sieve, 53 to 69 weight percent passing a No. 16 sieve, 11 to 21 weight percent passing a No. 50 sieve and 0 to 6% weight percent passing a No. 200 sieve. This preferred lightweight sand has a dry loose weight of between forty-six and fifty-two pounds (forty-nine pounds average) per cubic foot and a specific gravity of between 1.32 and 1.66 (1.40 average). If desired, lightweight sand having other gradations or gradation ranges can be used.

The lightweight aggregate 14 can comprise other materials. For example, cinders or the like can also be used as a lightweight aggregate 14, alone or in combination with other lightweight aggregates.

The highly polymer modified asphalt binder 12 comprises an asphalt having a penetration of between 20 and 500, depending on the climatic use. Penetration is determined according to ASTM D 5. The binder 12 also includes polymer and preferably surfactant. In addition, the binder 12 can include processing oil and air blown asphalt.

The polymer modification provides increased strength and flexibility to the binder 12, resulting in a stronger and more stable pavement patch 18. The polymer preferably comprises elastomers or plastomers. Examples of suitable elastomers or plastomers include: styrene-butadiene-styrene block co-polymer, styrene-isoprene-styrene block co-ploymer, styrene-butadiene-styrene block co-polymers, styrene butadiene rubber, butadiene-acrylonitrile, butadiene, natural isoprene, synthetic isoprene, polychloroprene, butyl rubber, butene polymers, isobutyl polymers, and ethylene vinyl acetate copolymer. The polymer can comprises a combination of these elastomers and plastomers. A surfactant, such as preferably one containing about 30 to 60% polyamines and polyalkylene glycols is added to the pavement patch composition 10 to improve the bonding properties of the binder 12 and helps the binder 12 to better adhere to pavement 16. Other suitable surfactants can be used.

The binder 12 can also contain other additives, including polymers. If desired, the binder 12 can contain other additives that modify or further tailor the properties of the binder. A few examples of some additives include waxes, resins, reclaimed rubber or crum rubber, and antioxidants. Other additives known to those skilled in the art can be added to the binder 12.

If the pavement patch composition 10 will be used in a cooler climate, a processing oil, such as preferably a naphthenic oil having an Aniline Point of 150° to 175° F. and a Saybolt viscosity of 1125 to 1325 SUS at 100° F. is added to the binder 12 to soften the asphalt and make the resulting pavement patch 18 less brittle in cooler temperatures. Various other processing oils can be used, if desired. Examples of other suitable processing oils include paraffinnic oils and aromatic oils.

Air blown asphalt can be added to composition 10 to provide a harder, less compressive material at elevated ambient temperatures. An example of a suitable air blown asphalt preferably is one selected from the ASTM D 312 Type III or Type IV asphalts.

The composition 10 can comprise approximately 30% to 70% lightweight aggregate 14, by weight, and approximately 30% to 70% highly modified asphalt binder 12, by weight. It preferably comprises approximately 50% to 55% lightweight aggregate 14 and approximately 45% to 50% highly modified polymer asphalt binder 12 measured by total weight of the composition 10. Where lightweight coarse aggregate is used as part of the lightweight aggregate, the composition 10 preferably has at least 8 weight percent of lightweight coarse aggregate and at least 42 weight percent lightweight sand. Where only lightweight sand is used, the composition preferably has at least 50 weight percent of lightweight sand.

The specific formulation of the pavement patch composition 10 can be varied depending upon factors such as the specific climate of use, traffic conditions that will be encountered, and the size of the void to be filled. For example, the pavement patch composition 10 can be formulated specifically for use in a cold climate or a warmer climate by varying the formulation of the binder 12.

If the pavement patch composition 10 will be used in a cooler climate having a temperature range not greater than approximately 100° F. (38° C.), the highly-modified polymer asphalt binder 12 preferably comprises between approximately 78 weight percent and approximately 88 weight percent asphalt having an ASTM D 5 Penetration value between approximately 50 and approximately 200, between approximately 3 weight percent and approximately 10 weight percent processing oil, between approximately 4 weight percent and between 12 weight percent of polymer, and between approximately 0 weight percent and approximately 1 weight percent surfactant. In addition, the lightweight aggregate 14 preferably comprises approximately between 80 weight percent and 100 weight percent lightweight sand and between approximately 0 weight percent and 20 weight percent lightweight coarse aggregate. Where the composition 10 is used to fill smaller voids and a fine aggregate is desired, the lightweight aggregate 12 can comprise up to of 100 weight percent lightweight sand.

If the pavement patch composition 10 is to be used in a moderate climate having a temperature range between approximately 110° F. (43° C.) and 0° F. (18° C.), the highly-modified polymer asphalt binder 12 preferably comprises between approximately 60 weight percent and approximately 90 weight percent asphalt having an ASTM D 5 Penetration value of approximately 50 to approximately 200, between approximately 4 weight percent and approximately 12 weight percent polymer, between approximately 0 weight percent and approximately 5 weight percent process oil, between approximately 0 weight percent and 1 weight percent surfactant, and between approximately 0 and approximately 30 weight percent air blown asphalt. In addition, the lightweight aggregate 14 preferably comprises between approximately 80 weight percent approximately 100 weight percent lightweight sand and between approximately 0 weight percent and 20 weight percent lightweight coarse aggregate. Where the composition 10 is used to fill smaller voids and a fine aggregate is desired, all of the lightweight aggregate 14 can be lightweight sand.

In one preferred moderate climate composition 10, the binder 12 preferably comprises approximately 90 weight percent asphalt having an ASTM D 5 Penetration of approximately 50 to 70, approximately 9 weight percent polymer, and approximately 1 weight percent surfactant. In addition, the lightweight aggregate 14 preferably comprises approximately 82 weight percent lightweight sand and approximately 18 weight percent lightweight coarse aggregate. The composition 10 comprises approximately 46 weight percent highly modified asphalt binder 12 and 54 weight percent lightweight aggregate.

If the composition 10 is to be used in a warmer climate having a temperature range between approximately 120° F. (49° C.) and 20° F. (−7° C.), the binder preferably comprises between approximately 60 weight percent and approximately 95 weight percent asphalt having an ASTM D 5 Penetration value between approximately 50 and approximately 200, between approximately 4 weight percent and approximately 12 weight percent polymer, between approximately 0 weight percent and approximately 1 weight percent surfactant and between approximately 0 weight percent and approximately 30 weight percent air blown asphalt. In addition, the lightweight aggregate 14 preferably comprises between approximately 80 weight percent and approximately 100 weight percent lightweight sand and between approximately 0 weight percent and 20 weight percent lightweight coarse aggregate. Where the composition 10 is used to fill smaller voids and a fine aggregate is desired, all of the lightweight aggregate 14 can be lightweight sand.

A preferred method of making the pavement patch composition 10 comprises the steps of making the binder 12, and having the binder 12 in a molten state, mixing the lightweight aggregate 14 with the molten binder 12 to form the pavement patch composition 10, and allowing the flowable pavement patch composition to cool (or cooling the composition) to a solid form 20 in a package such as a brick or keg.

In making a preferred highly modified polymer asphalt binder 12, asphalt, and processing oil (if used), is heated to a temperature of between approximately 275° F. and 325° F. The asphalt used preferably has an ASTM D 5 Penetration of approximately 70 to approximately 200. One suitable and preferred asphalt is a material complying with the requirements for AC-10 asphalt grading. If processing oil is added, the penetration can be as high as 200 to 300, or even higher. Next, the polymer is added to the heated mixture and dispersed into the asphalt. Surfactants and air blown asphalt can be added before or after this dispersion step to complete the binder 12.

After the binder 12 is made, the binder 12 preferably is evaluated to determine its viscosity. If the binder's viscosity is evaluated, it is preferably evaluated in accordance with ASTM D4402 (Standard Test Method for Viscosity Determination of Unfilled Asphalts Using the Brookfield Thermosel Apparatus).

In addition, the softening point of the binder 12 is preferably determined. If the softening point is measured, it is preferably measured in accordance with ASTM D36 (Standard Test Method for Softening Point of Bitumen (Ring-and-Ball Apparatus)). This test measures the temperature range at which a material transforms from a solid to a thick liquid.

The needle penetration of the binder 12 preferably is also measured. If the needle penetration is measured, it is preferably measured in accordance with ASTM D5 (Standard Test Method for Penetration of Bituminous Materials). This test indicates the hardness of a material. A needle is pressed into the material and the amount of penetration into the material that takes place over time is measured.

The flexibility of the binder 12 preferably is determined. If flexibility is determined, flexibility in accordance with ASTM D3111 (modified) is determined. Results for this test are located in the row identified as "Flexibility" in Table 1 below.

Finally, the ductility of the binder 12 preferably is determined. If the ductility is determined, it is determined according to ASTM D 113.

The preferred ranges for the highly modified polymer asphalt binders used in the three preferred pavement patch compositions previously discussed are listed in Table 1 below.

TABLE 1

| Parameter | Cold Climate Binder (<100° F. (38° C.)) | Moderate Climate Binder (110 ° F. (43° C.)– 0° F.(18° C.)) | Warmer Climate Binder (120° F.(49° C.)–20° F. (-7° C.)) |
| --- | --- | --- | --- |
| Thermosel Viscosity 380° F. #27 pr @ 50 rpm | 1500 CP max. | 1300 CP max. | 1300 CP max. |
| Softening Point (R & B) | 215 F. min. | 220 F. min. | 220 F. min. |
| Needle Pen @ 77° F. 100 g, 5 sec. | 60 max. | 55 max. | 50 max. |
| Flexibility, 1", 90 deg. 10 sec. | Pass at -20° F. | Pass at 0° F. | Pass at 20° F. |
| Ductility @ 77° F. ASTM D 113 | 20 cm minimum | 20 cm minimum | 20 cm minimum |

In making the composition 10, the binder 12 is added to a mixer and heated to a temperature of approximately 350° F. to approximately 400° F. Lightweight aggregate 14 is preferably heated to approximately 212° F. to 400° F. and added to the mixer. The mixture is then heated and mixed a minimum of fifteen minutes to temperature of approximately 350° F. to approximately 405° F. to complete mixing and finish the composition 10.

After the composition 10 is made, it is preferably evaluated to determine its viscosity. To determine if the viscosity of the composition 10 lies in a desired range, a pourability test preferably is run. A suitable pourability test helps to ensure that the flow of the composition 10 is within a specified range. The test also ensures that the composition 10 will suitably flow when reheated and applied out in field without being so thin as to flow out of voids or being too weak to withstand traffic.

In running a preferred pourability test, 2000 grams of the composition 10 is poured out from a fill valve into a receiver can (not shown) that is heated. The temperature of the composition 10 in the can is checked with a probe thermometer (not shown) and tilted, allowing some of the composition 10 in the can to pour out. A stopwatch is started when the can is tilted to horizontal and the can is stood back up after five seconds. The weight of the composition poured into the receiver can is then weighed. There should be between 1000 and 1400 grams of the composition 10 in the can to pass the pourability test.

In addition, the flexibility of the composition 10 is preferably determined. The flexibility is determined by casting a 10 inch by 1 inch by ½ inch bar of composition 10. This bar is conditioned at test temperature on its 10 inch by 1 inch face. The bar is then flexed ½ inch on its 10 inch by 1 at its center over a 1 inch mandrel. To meet the requirements of this test, the composition shall not crack into two pieces.

In addition, the stability of the composition 10 preferably determined. The stability is determined by filling a 2 inch diameter, 1 inch tall ring mold with the composition 10. After cooling the ring mold is removed and the specimen is placed in a Parallel Plate Plastometer as described in ASTM D 4989 and compressed with the top plate for 1 hour at 158° F. (70° C.). After the testing cycle is complete, the increase in diameter from the original two inches of the specimen is determined by measuring.

In addition, the adhesion of composition 10 is preferably determined. The adhesion is determined by pouring the composition 10, while at 400° F., into a 1 inch by 1 inch by 2 inch reservoir between two 1 inch by 2 inch by 3 inch concrete blocks. This assembly is allowed to condition to standard lab conditions of 73.4±3.6° F. The assembly is then placed in suitable grips of a Universal Testing Machine and extended at 0.5 inches per minute until complete failure. The maximum stress is measured in pounds per square inch of surface area to one block.

The desired properties for the three preferred pavement patch compositions previously discussed are listed in Table 2 below.

TABLE 2

| | Cold Climate Composition | Moderate Climate Composition | Warm Climate Composition |
| --- | --- | --- | --- |
| Temperature Range | (<100° F. (38° C.)) | (110° F.(43° C.) to 0° F.(-18° C.)) | 120° F.(49° C.) to 20° F.(-7° C.) |
| Flexibility Testing | Pass @ -20° F. (-29° C.) | Pass @ 0° F. (-18° C.) | Pass @ 20° F. (-7° C.) |
| Stability Testing | 0.6 inches maximum | 0.5 inches maximum | 0.4 inches maximum |
| Adhesion Testing | 15 pounds per square inch minimum | 20 pounds per square inch minimum | 25 pounds per square inch minimum |

As a result of using lightweight aggregate 14 that is mixed with binder 12 and then solidified, the resultant solidified composition 10 is light in weight, which costs less to ship. For example, a preferred pavement composition 10 having lightweight aggregate with a maximum specific gravity of 1.35 will have a maximum weight of no more than twelve pounds per gallon. This means a truck capable of hauling a standard payload of 45,000 pounds can haul between 3,700 and 4,000 gallons of the composition 10.

Lightweight aggregate 14 is also advantageous because it homogenously distributes itself during mixing and remains homogenously distributed in the composition 10 during solidification. This helps to ensure fast and uniform reheating out in the field and helps to keep the aggregate uniformly distributed during reheating and solidification of the patch 18.

In applying the pavement patch composition 10 out in the field, the composition 10 is first reheated until it reaches a liquid or flowable state. The flowable composition 10 is applied in the void 22, or another area in need of repair, and the composition 10 is allowed to cool. If desired, means, such as a blower or the like, can be employed to accelerate cooling of the composition 10 after it has been poured into the void 22. When cooled, it preferably forms a flexible, self-adhering pavement patch 18.

More specifically, in one preferred method, solid premixed pavement patch composition 10 is reheated to a temperature of between approximately 375° F. and approximately 410° F. to make it flowable. The void 22 must be prepared before the heated composition 10 is poured into the void 22. The material is then poured into the void 22 (or voids), leveled to a desired height, and allowed to cool or cooled to ambient temperature before the pavement 16 is reopened to traffic.

Figure 6:
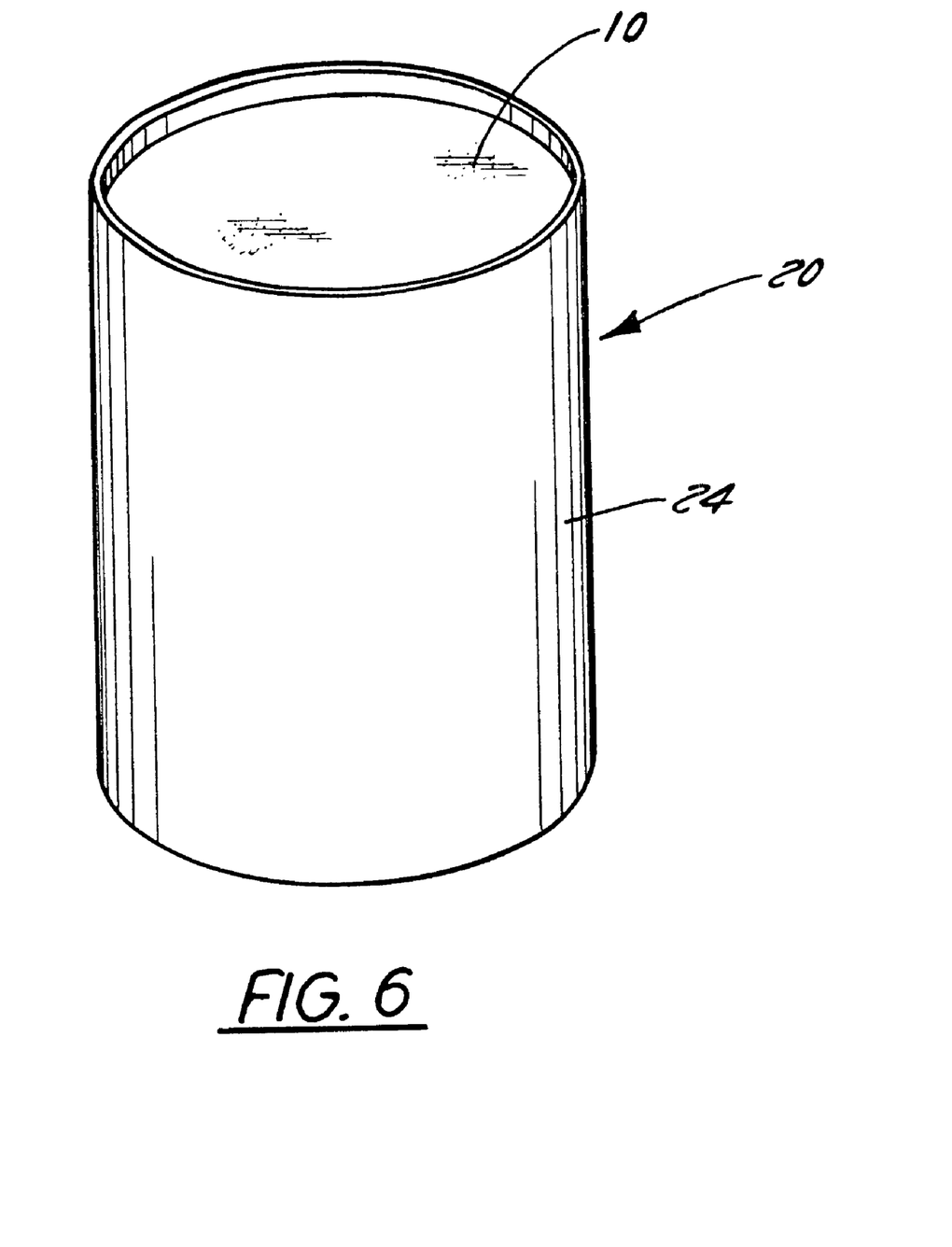
FIG. 6 is a solid brick or keg of the pavement patch composition after it has been mixed and solidified.

In its preferred embodiment, the pavement patch composition 10 is supplied in solid premixed form in self-release strippable containers 20, such as the keg or brick 20 shown in FIG. 6. In use, the outer container 24 is stripped from the solid composition 10. The solid composition 10 is placed into a suitable heated applicator (not shown), such as a Crafco PolyPatch applicator, commercially marketed by the assignee herein. A suitable applicator includes a tank or kettle (preferably at least a two-hundred gallon tank) into which the composition 10 is placed, a heater (not shown) that typically includes an oil jacket (not shown) around the tank through which heat is transferred to the composition 10 in the tank, a temperature sensor (not shown) used to control heating, an agitator (not shown) in the tank for stirring and mixing the composition 10 when it becomes flowable, and a drain hole (not shown) in a side wall or bottom of the tank through which the composition 10 is dispensed when it becomes sufficiently flowable. The drain hole preferably is about four inches in diameter. A double knife valve (not shown), or another suitable valve, in fluid-flow communication with the drain hole permits the pavement patch composition 10 to be selectively dispensed after it has been suitably heated. Preferably, the drain hole communicates the material to a conduit 26 (FIG. 2), such as a trough, pipe, hose, or the like.

Where this type of an applicator is used to heat and melt the pavement patch composition 10, the tank (preferably the oil in the jacket) is preheated, preferably to a temperature of between approximately 450° F. and approximately 525° F. (232° C. to 274° C.). Solid pavement patch composition 10 is then added to the tank. When the material 10 has melted sufficiently for the agitator to turn, agitation should begin. For maximum production, application of the composition 10 can start when the tank is nearly full of melted composition 10. Preferably, the composition 10 is heated to the application temperature range of approximately 375° F. to approximately 410° F. (190° C. to 210° C.) prior to it being applied. At application temperature, the composition 10 typically has a thick, grainy slurry appearance and is flowable. As the quantity of melted composition 10 in the applicator decreases due to it being applied, additional solid composition 10 can be added. Preferably, agitation is stopped when additional solid composition 10 is added. If the temperature of the composition 10 already in the applicator drops below approximately 375° F. (190° C.) when solid composition 10 is added, application is stopped until the correct application temperature range is once again reached. During application, agitation preferably is constant, except for when adding additional solid composition 10.

The composition 10 should be applied when the surface temperature exceeds approximately 40° F. (4° C.). Application at lower temperatures may result in reduced adhesion due to possible presence of too much moisture or ice. If the surface temperature is lower than 40° F. (4° C.), it may be warmed by an appropriate method to achieve the minimum required temperature and drive off at least some of the moisture. If conditions require application to be performed at surface temperatures less than 40° F. (4° C.), care should be used to ensure that the work area is dry as possible and free from ice and other contaminants. Composition temperature should be maintained at the safe heating temperature. Preferably, applied composition 10 is checked to assure adequate adhesion between it and the pavement 16.

In preparing the area or void 22 that will receive the composition 10, the area must be clean, dry, and preferably sound before it can be repaired. It need not be primed unless priming is desired. The surface of the pavement 16 in and around the void 22 should be cleaned to the same level of cleanliness as typically used for hot-applied pavement crack and joint sealant. Air blowing, sandblasting, heat lancing, wire brushing, and other similar procedures can be used to prepare the area that will receive the composition 10.

Figure 1:
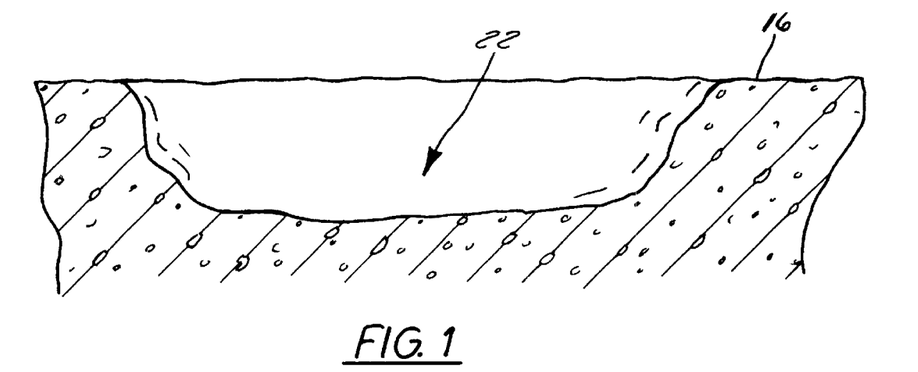
FIG. 1 is a cross sectional view of a void in pavement.
Figure 2:
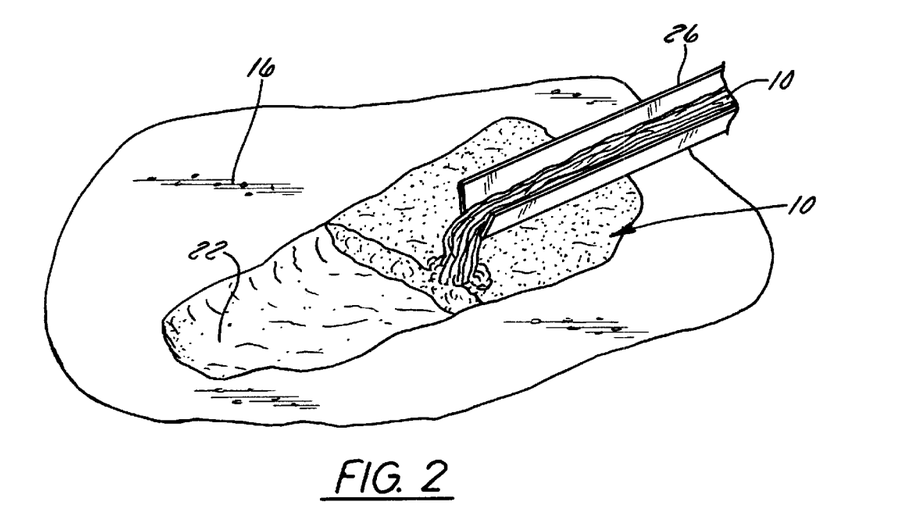
FIG. 2 is a perspective view of the void depicting a patch composition of the invention being applied in the void.
Figure 3:
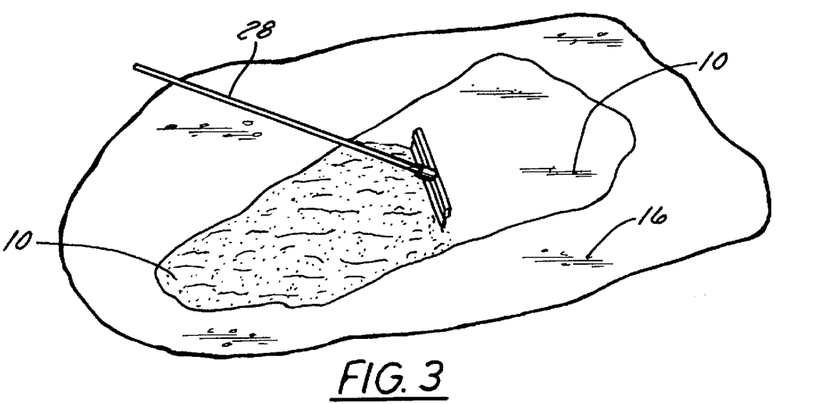
FIG. 3 is a perspective view of the patch composition being leveled.
Figure 4:
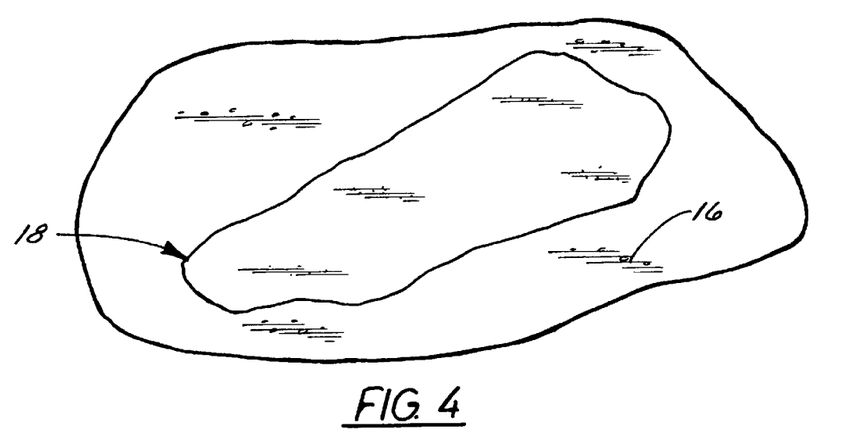
FIG. 4 is a perspective view of the patch composition after it has been leveled.
Figure 5:
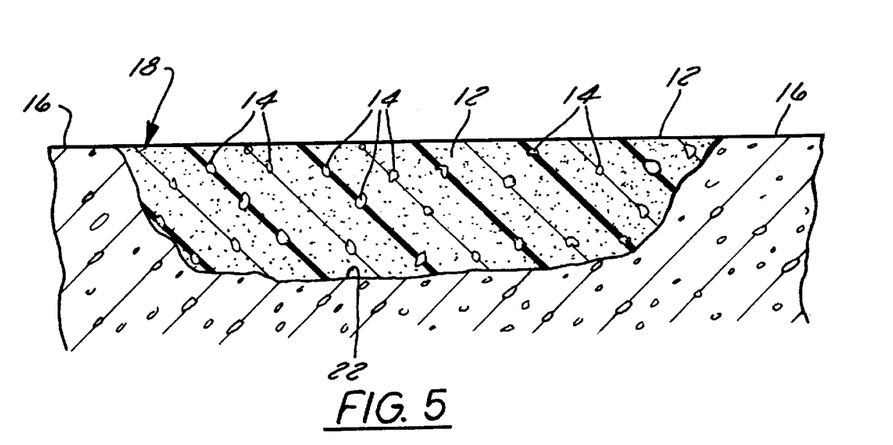
FIG. 5 is a cross sectional view of the patch that results when the patch composition solidifies.

Once the pavement patch composition 10 has been suitably heated until it is sufficiently flowable, it is applied directly to the work area. FIG. 2 illustrates a method of flowing the composition 10 into a void 22, where composition 10 is directed via a trough 26. As is illustrated in FIG. 3, the composition 10 in the void 22 is then leveled to the desired height of surrounding pavement 12 surface with a squeegee 28 or another leveling device. No compaction is required. The composition 10 is allowed to cool to ambient temperature to form a solid patch 18 before the pavement is reopened to traffic. Cooling time will vary depending on the size of the application and ambient temperature. Generally, thirty to sixty minutes of cooling for each inch (2.5 cm) of material depth is desirable. The pavement patch composition 10 should be applied to a minimum thickness of about ⅜ inch (10 mm) for optimum performance. FIG. 4 illustrates a void 22 that has been repaired using the pavement patch composition 10. FIG. 5 shows a cross sectional view of such a repaired void 22, with the aggregate 14 in the pavement patch 18 exaggerated for clarity.

For patching applications where the area or void 22 is deeper than approximately two inches, the pavement patch composition 10 preferably is applied in two separate layers. The first application fills the work area to within ½ inch (12 mm) to one inch (25 mm) of the desired height. After the first layer has cooled, a second layer is applied level with the surrounding pavement 12. This technique reduces the amount of material shrinkage that occurs when the patch 18 cools.

When applied, the binder 12 is self-adhesive and develops a strong bond to the desired work area. Shrinkage of as much as about 5% can occur as the composition 10 in the void 22 cools from application temperature to ambient temperature to form the patch 18.

If desired, roofing felt paper can be used along the work area boundaries to create a neat, well-defined edge. The paper should be removed immediately after application of the pavement patch composition 10 and before the composition 10 cools. Another procedure that can be used to produce neat, well-defined edges is to rout around the patch area perimeter to form a groove approximately one to two inches wide and approximately one-half inch deep. The patch material is then applied to the groove edge.

The pavement patch composition 10 has an application lifetime, or a length of time, that permits it to be usable at application temperatures (i.e. such that it is flowable) of approximately twelve to approximately fifteen hours. Application life can be extended by adding fresh composition 10 as the quantity in the applicator decreases. Preferably, composition 10 that remains in an applicator should be reheated only once.

As previously discussed, this method of patching pavement voids 22 is particularly well suited for the repair of mid-size pavement voids 22. These mid-size pavement voids 22 include those that are larger than those typically filled with crack and joint sealing methods and those that are smaller than those typically filled with remove and replace methods or pothole repair methods. The pavement patch composition 10 is easily prepared and applied to pavement 16 and voids 22. This method generates a patch 18 that remains flexible when cooled to ambient temperature after application to pavement 16 and no compaction of it is required since it is a flowable, voidless mix.

The resulting pavement patch 18 that results from the pavement patch composition 10 of this invention displays superior self-adherence, flexibility, and strength. The use of lightweight expanded aggregate 14 is advantageous because it easy to mix when the composition 10 is being heated and because it remains in suspension when the composition 10 is poured into a void 22 or another area being patched. This results in a patch 18 that has aggregate 14 that remains evenly distributed throughout the patch 18 while it solidifies, imparting to the solid patch 22 the advantageous ability to handle the relatively heavy loading conditions associated with vehicle traffic. The use of polymer asphalt binder 12 keeps the patch 18 impact and bleed resistant and resilient, even in hot or cold weather, all while maintaining a superior bond with the aggregate 14 and the surrounding pavement 16.

"Pavement" as used herein refers to pavement made of concrete, asphalt, and the like. Pavement includes, but is not limited to, roadways, parking lots, airstrips, bike paths, and walking paths.

Many changes and modifications can be made without departing from the scope and spirit of the invention. Such changes and modifications will become apparent from the appended claims.

What is claimed:

1. A hot-applied pavement patching composition comprising:
   (a) a lightweight aggregate;
   (b) polymer modified asphalt binder having a penetration of between 20 and 500, said polymer modified asphalt binder comprising;
       a polymer;
       a surfactant; and
   (c) an air blown asphalt.

2. The composition of claim 1 wherein the composition comprises:
   (a) approximately 30% to approximately 70% of the lightweight aggregate, by weight; and,
   (b) approximately 30% to approximately 70% of the polymer modified asphalt binder.

3. The composition of claim 1 wherein the lightweight aggregate has a specific gravity between 1.1 and 1.8.

4. The composition of claim 3 wherein the lightweight aggregate comprises an expanded aggregate having a specific gravity of between 1.1 and 1.5.

5. The composition of claim 3 wherein the lightweight aggregate comprises sand having a specific gravity of between 1.2 and 1.8.

6. The composition of claim 5 wherein the sand comprises a lightweight sand having a specific gravity of between 1.32 and 1.66.

7. The composition of claim 5 wherein the sand comprises a lightweight sand, the lightweight aggregate consists only of the lightweight sand, and the composition comprises at least 50% by weight of the lightweight sand.

8. The composition of claim 5 wherein the lightweight aggregate further comprises an expanded aggregate.

9. The composition of claim 8 wherein the expanded aggregate is selected from the group consisting of expanded shale and expanded clay.

10. The composition of claim 9 wherein the expanded aggregate comprises a lightweight coarse aggregate having a specific gravity of between 1.16 and 1.33.

11. The composition of claim 1 wherein the composition is comprised of between 4% and 12% by weight of polymer.

12. The composition of claim 1 wherein the polymer modified asphalt binder comprises between approximately 78% and approximately 88% by weight asphalt having an ASTM D 5 Penetration value of between 50 and 200, between approximately 3% and approximately 10% by weight of a processing oil, between approximately 4% and approximately 12% by weight of polymer, and as much as approximately 1% by weight of a surfactant.

13. The composition of claim 12 wherein the lightweight aggregate comprises at least 80% by weight of a lightweight sand and no more than 20% by weight of an expanded lightweight coarse aggregate.

14. The composition of claim 12 wherein all of the lightweight aggregate consists of a lightweight sand.

15. The composition of claim 1 wherein the polymer modified asphalt binder comprises between approximately 60% and approximately 90% by weight asphalt having an ASTM D 5 Penetration value of between approximately 50 and approximately 200, no more than approximately 5% by weight of a processing oil, between approximately 4% and approximately 12% by weight of polymer, no more than approximately 1% by weight of a surfactant, and no more than approximately 30% by weight of an air blown asphalt.

16. The composition of claim 15 wherein the lightweight aggregate comprises at least 80% by weight of a lightweight sand and no more than 20% by weight of an expanded lightweight coarse aggregate.

17. The composition of claim 15 wherein all of the lightweight aggregate consists of a lightweight sand.

18. The composition of claim 1 wherein the polymer modified asphalt binder comprises between approximately 60% and approximately 95% by weight asphalt having an ASTM D 5 Penetration value of between approximately 50 and approximately 200, between approximately 4% and approximately 12% by weight of polymer, no more than approximately 1% b weight of a surfactant, and no more than approximately 30% by weight of an air blown asphalt.

19. The composition of claim 18 wherein the lightweight aggregate comprises at least 80% by weight of a lightweight sand and no more than 20% by weight of an expanded lightweight coarse aggregate.

20. The composition of claim 18 wherein all of the lightweight aggregate consists of a lightweight sand.

21. The composition of claim 1 wherein the composition comprises:
   (a) approximately 46% by weight polymer modified asphalt binder with the polymer modified asphalt binder comprised of approximately 90% by weight asphalt having an ASTM D 5 penetration of approximately 50 to 70, approximately 9% by weight of polymer, and approximately 1% by weight of a surfactant; and
   (b) approximately 54% by weight of the lightweight aggregate with the lightweight aggregate comprised of approximately 82% by weight of a lightweight sand and approximately 18% of a lightweight coarse aggregate.

22. The composition of claim 1 wherein the composition comprises:
   (a) between 45% and 50% of binder by total weight of the composition comprising;
      1. an asphalt having a pen value of between 20 and 500;
      2. one or more polymers selected from the group consisting of;
         i. styrene-butadiene-styrene block co-polymer;
         ii. styrene-isoprene-styrene block co-polymer;
         iii. styrene-ethylene butylene-styrene block co-polymers;
         iv. styrene butadiene rubber;
         v. butadiene-acrylonitrile;
         vi. butadiene;
         vii. natural isoprene;
         viii. synthetic isoprene;
         ix. polychloroprene;
         x. butyl rubber;
         xi. butene polymers;
         xii. isobutyl polymers; and,
         xiii. ethylene vinyl acetate.
      3. surfactant; and,
   (b) the lightweight aggregate comprising;
      1. at least 8% by weight of expanded aggregate; and,
      2. at least 42% by weight of sand.

23. The pavement patching composition of claim 1 wherein the composition is flowable in a heated state.

24. A hot applied, flowable, pavement patching composition comprising:
   (a) approximately 30 to 70 wt % polymer modified asphalt cement binder comprising approximately 4% to 12% polymer modifiers; and
   (b) 30 to 70 wt % lightweight aggregate having a specific gravity less than 1.8 and having particles ranging in size from 1 inch maximum to 200 mesh sizes,
wherein the composition is adhesive, flexible and does not require compaction during application.

25. The composition of claim 24 wherein the lightweight aggregate comprises an expanded coarse aggregate and a lightweight sand.

26. The composition of claim 25 wherein the composition has at least 8% by weight of expanded coarse aggregate and at least 42% by weight of lightweight sand.

27. The composition of claim 24 wherein the polymer modified asphalt binder has the penetration of between 20 and 500.

28. The composition of claim 27 wherein the polymer modified asphalt binder comprises a polymer and a surfactant.

29. The composition of claim 28 wherein the polymer comprises an elastomer or a plastomer.

30. The composition of claim 29 wherein the polymer is selected from the group consisting of styrene-butadiene-styrene block co-polymer, styrene-isoprene-styrene block co-polymer, styrene-ethylene butylene-styrene block co-polymers, styrene butadiene rubber, butadiene-acrylonitrile, butadiene, natural isoprene, synthetic isoprene, polychloroprene, butyl rubber, butene polymers, isobutyl polymers, and ethylene vinyl acetate copolymer.

31. The composition of claim 29 wherein the surfactant comprises at least one of polyamines and polyalkylene glycols.

32. The composition of claim 29 wherein the surfactant comprises 30% to 60% polyamines and polyalkelene glycols.

33. The composition of claim 28 wherein the polymer modified asphalt binder further comprises a processing oil.

34. The composition of claim 33 wherein the processing oil comprises a napthenic oil.

35. The composition of claim 34 wherein the napthenic oil has an Aniline Point of between 150° and 175° F. and a Saybolt viscosity of between 1125 SUS and 1325 SUS at 100° F.

36. The composition of claim 33 wherein the processing oil is a paraffinnic oil or an aromatic oil.

37. The composition of claim 28 wherein the polymer modified asphalt further comprises an air blown asphalt.

38. The composition of claim 37 wherein the air blown asphalt is an ASTM D 312 Type III or Type IV asphalt.

39. The composition of claim 28 wherein the polymer modified asphalt binder further comprises at least one of a wax, a resin, a reclaimed rubber, and an antioxidant.

40. The composition of claim 24 wherein the composition comprises:
   (a) approximately 50% to 55% of the lightweight aggregate, by weight; and
   (b) approximately 45% to 50% of the polymer modified asphalt binder, by weight.

41. The composition of claim 40 wherein the polymer modified asphalt binder comprises:
   (a) an asphalt; and
   (b) a polymer.

42. The composition of claim 41 wherein the asphalt binder further comprises:
   (a) a surfactant;
   (b) a processing oil; and
   (c) an air blown asphalt.

43. The composition of claim 24 wherein the polymer modified asphalt binder comprises an asphalt and a polymer wherein the polymer is selected from the group consisting of:
   (a) styrene-butadiene-styrene block co-polymer;
   (b) styrene-isoprene-styrene block co-polymer;
   (c) styrene-ethylene butylene-styrene block co-polymers;
   (d) styrene butadiene rubber;
   (e) butadiene-acrylonitrile;
   (f) butadiene;
   (g) natural isoprene;

(h) synthetic isoprene;
(i) polychloroprene;
(j) butyl rubber;
(k) butene polymers;
(l) isobutyl polymers; and,
(m) ethylene vinyl acetate.

44. The composition of claim 24 wherein the composition comprises:
  (a) between 30% and 70% of binder by total weight of the composition comprising:
    (1) an asphalt having a penetration value between 20 and 500;
    (2) polymer;
    (3) surfactant;
  (b) at least 8% by weight of expanded lightweight coarse aggregate having a specific gravity of no greater than 1.5; and,
  (c) at least 42% by weight of lightweight sand.

* * * * *